United States Patent [19]

Ruderman et al.

[11] Patent Number: 5,779,904
[45] Date of Patent: Jul. 14, 1998

[54] SYNTHESIS OF INORGANIC MEMBRANES ON SUPPORTS

[75] Inventors: Warren Ruderman, Demarest, N.J.; James R. Fehlner, Salem Township, Wayne County, Pa.; Zhenyu Zhang, New York, N.Y.

[73] Assignee: Inrad, Northvale, N.J.

[21] Appl. No.: 477,035

[22] Filed: Jun. 7, 1995

Related U.S. Application Data

[63] Continuation-in-part of Ser. No. 864,814, Mar. 31, 1992, Pat. No. 5,474,681.

[51] Int. Cl.$^6$ .................................................. B01D 39/00
[52] U.S. Cl. .................... 210/500.25; 210/500.26; 210/502.1; 210/490; 427/244; 427/245; 427/246
[58] Field of Search ..................... 427/244, 245, 427/246; 210/500.25, 502.1, 510.1, 496, 500.26, 490; 502/4, 5, 60; 428/195

[56] References Cited

U.S. PATENT DOCUMENTS

| | | | |
|---|---|---|---|
| 4,499,149 | 2/1985 | Berger. | |
| 4,699,892 | 10/1987 | Suzuki | 502/4 |
| 4,740,219 | 4/1988 | Kulprathipanja et al. | |
| 4,828,588 | 5/1989 | Hwang et al. | |
| 4,904,518 | 2/1990 | Mercer et al. | 428/195 |
| 5,019,263 | 5/1991 | Haag et al. | |
| 5,069,794 | 12/1991 | Haag et al. | |
| 5,100,596 | 3/1992 | Haag et al. | 264/42 |
| 5,110,972 | 5/1992 | Greenlee. | |
| 5,468,699 | 11/1995 | Zhang et al. | 502/60 |
| 5,474,681 | 12/1995 | Fehlner et al. | 210/500.25 |
| 5,591,345 | 1/1997 | Engelen et al. | 210/640 |

FOREIGN PATENT DOCUMENTS

| | | |
|---|---|---|
| 1 235 684 | 4/1988 | Canada. |
| 481 658 | 4/1992 | European Pat. Off.. |
| 481 659 | 4/1992 | European Pat. Off.. |
| 481 660 | 4/1992 | European Pat. Off.. |

OTHER PUBLICATIONS

Tsikoyiannis, J.G. and Haag, W., O., Zeolites, 12, 126–130 (1992).

Anderson, M. W., Pachis, K.S., Shi, J. and Carr, S.W., J. Mater. Chem., 2, 255–6 (1992).

Jansen, J.C., Nugroho, W. and van Bekkum, H., Proceedings of the Ninth International Zeolite Conference, Montreal, Eds., van Ballmoos, et al., Butterworth–Heinmann, Boston, 247–54 (1992).

Geus, E. R., den Exter, M.J. and van Bekkum, H., J. Chem. Sci Faraday Trans., 88, 3101–9 (1992).

Geus, E.R., van Bekkum, H., Bakker, W.J.W. and Moulijn, Microporous Materials, 1, 131–47 (1993).

Sano, T., Mizukami, F., Takaya, H., Mouri, T., and ?, M., Bull. Chem. Soc. Japan, 65, 146–54 (1992).

Sano, T., Kiyozumi, Y., Maeda, K., Toba, M., Niwa, S. and Mizukami, F., J. Mater. Chem., 2, 141–2 (1992).

Sano, T., Hasegawa, M., Kawakami, Y., Kiyozumi, Y., Yanagishita, H., Kitamoto, D. and Mizukami, F., Zeolites and Related Microporous Materials: State of the Art 1994, Eds., Weitkamp, J., Karge, H.G., Pfeifer and Holderich, W., Elsevier Science, 1175–82 (1994).

(List continued on next page.)

Primary Examiner—Ana Fortuna
Attorney, Agent, or Firm—Stroock & Stroock & Lavan LLP

[57] ABSTRACT

Inorganic membranes such as zeolite membranes or other molecular sieve membranes can be provided by using silicone polymer material as starting material. A thin film zeolite membrane or a thin film membrane formed of interlocking zeolite crystals can be provided. Water soluble or water insoluble silicones can be treated in a basic solution under conditions and with an appropriate structure directing template, suitable aluminum content and at a temperature that is appropriate for growing a desired inorganic crystal framework. The membranes can be formed across the perforation of a support, such as a steel screen.

37 Claims, 7 Drawing Sheets

OTHER PUBLICATIONS

Herreros, B. and Klinowski, J., *Chem. Phys. Letters*, 220, 478–80 (1994).

Noack, M., Kolsch, P., Venzka, E., Toussaint, P. and Caro, J., *Microporous Materials*, 3, 201–6 (1994).

Zeolites In Catalysis And Adsorption, D.E.W. Vaughan, *Chemical Engineering Progress*, Feb., 1988, pp. 25–31.

Hayhurst, D.T. and Lee, J.C., Parameters Affecting The Growth of Large Silicalite Crystals, 7th Int'l Zeolite Conference (1986).

Inorganic Membranes For Advanced Separations, 1991 Technology and Business Review.

CAS Search Report directed to Zeolite Membranes.

Sano, T. et al., Preparation And Characterization Of ZSM-5 Zeolite Film, "Zeolites", Nov., Dec. 1991, pp. 842–845.

Rolison, Debra R., Ishikawa et al., Zeolite–Modified Electrodes And Electrode–Modified Zeolites, *Chemical Reviews*, vol. 90 (1990), pp. 867–878.

Ishikawa, Akira et al., Separation Of Water–Alcohol Mixtures By Permeation Through A Zeolite Membrane On Porous Glass, *J. Chem. Soc.*, Chem. Commun. (1989), pp. 764–765.

SYNTHESIS OF INORGANIC MEMBRANES ON SUPPORTS

CROSS REFERENCE TO RELATED APPLICATION

This application is a continuation-in-part of U.S. Ser. No. 07/864,814 filed Mar. 31, 1992, entitled SYNTHESIS OF INORGANIC MEMBRANES now U.S. Pat. No. 5,474,681.

BACKGROUND OF THE INVENTION

The invention relates generally to inorganic membranes and more particularly to inorganic membranes synthesized onto support structures.

The use of membranes to separate mixtures is becoming an important technique for effecting separations. Membrane separations tend to require less energy than competing techniques, such as distillation processes. The use of membranes can also be less costly and more simple to implement.

Inorganic membranes including layers of inorganic material are presently involved with only a small part of the industrial separations market and are typically more expensive to manufacture than organic membranes. Although organic membranes tend to be limited to a narrow range of operating temperatures, inorganic membranes can be functional at temperatures above 1000° C. Inorganic membranes have found many industrial applications in the food and beverage industry. Other applications include the concentration of biomolecules from fermentation liqueurs, separation of gases and purification of polluted water and air.

An important class of inorganic materials to be used in membranes will be referred to herein as zeo-type materials. These are crystalline solids that have pores in the crystals of from 3 to 15 angstroms in diameter. These include silicates like silicalite, aluminosilicates (zeolites), metallosilicates, aluminophosphates, silicoaluminophosphates and metaloaluminophosphates. Materials of this type, as well as materials containing significantly larger nonuniform pores are referred to as molecular sieves.

Various techniques have been employed to form inorganic membranes. Examples include laser drilling and the use of sol gel technology. Sol gels are formed through the acidic or basic catalysis of the hydrolysis of metal or semi-metal alkoxies. The gel can be dried and fired to yield amorphous and ceramic-type materials. Thin films of inorganic material can also be formed on ceramic membranes that have large pores to yield a composite membrane including an inorganic thin film on a porous ceramic support.

There have been several attempts at forming inorganic membranes including zeolitic material. Zeolites are crystalline material that contain silicon oxides and aluminum oxides. Zeolites are formed with a three dimensional structure in which tetrahedra of primarily $SiO_4$ and $AlO_4$ are crosslinked by sharing oxygen atoms whereby the ratio of Si to O atoms is 1:2. Depending on the manner of bonding, the crystal structures can have various ring sizes containing eight, ten or twelve metal/semi-metal atoms. This presence of rings provides a crystal structure with pores and chambers that are of molecular size.

The presence of these chambers promotes the separation of molecules according to their size or their affinity to the zeolitic surfaces. For example, columns of powdered zeolite crystals can be used in the chromatography separation of alkane mixtures by separating branched and straight chain molecules. Gases can be separated with pressure swing absorption techniques. These are currently being used to separate oxygen from air for use by asthma patients. (Ruthven, D. M., *Chemical Engineering Progress*, 42, Feb. 1988).

Early attempts at forming zeolitic membranes involved the incorporation of zeolite crystals into organic membranes. This is discussed in U.S. Pat. No. 4,740,219, the contents of which are incorporated herein by reference. Although these membranes have advantages over organic membranes, they lack many of the other advantages of inorganic membranes. For example, these membranes lack suitable temperature stability.

The preparation of inorganic membranes including zeolitic material is also described in Sano, T., et al., *Zeolites*, Vol. 11, pp.842–845 (1991). The article describes forming a gel and heating the gel both with and without stirring. However, it has been found that when such gel synthesis processes are conducted, the resulting product can include significant amounts of zeolite in powder form.

The formation of layers of zeolite crystals from gels of silica was reported by Hayhurst and Lee in 1986 (Proceedings of the 7th International Zeolite Conference, Murakami, Y., Iijima, A.,m Ward, I. W. Ed., Elsevier, Tokyo, 113 (1986)). Haag and Tsikoyiannis (U.S. Pat. Nos. 5,019,263 and 5,069,794 and *Zeolites*, 12 126 (1992)) reported using the formulation of Hayhurst and Lee to grow layers of free standing zeo-type crystals. These membranes were grown on PTFE, nickel, stainless steel and silver plates. A layer was also reportedly grown on a microporous support with a thickness of 12 microns. Membranes of this thickness grown using this formulation may not have the same interlocking character described for thicker membranes. Electron microscopy of thicker membranes reportedly show that the side next to the Teflon apparently consisted of loosely held crystals of less than 0.1 microns size. Only thicker unsupported membranes were used in separations tests and no throughputs were reported. The contents of these articles and patents are incorporated herein by reference.

Sakurada et al. (Canadian Patent No., 1,235,684, incorporated by reference) reported the formation of membranes on the surface of glass, where the glass served as the silica source. These were described to be about 5 microns in thickness.

Conventional methods of forming inorganic membranes having a uniform and suitable structure have been less than completely satisfactory. Similarly, earlier methodology has not achieved a continuous thin film zeolite or a film of interlocking zeolite crystals. Rather, known methodology has achieved an agglomeration of zeolitic powder or a coating of zeolitic crystals on the walls of a ceramic or glass substrate. Also, a convenient way of handling the membrane and supporting it, while permitting high throughputs has not been provided. It is therefore desirable to provide an improved method of producing an improved membrane on an improved support to overcome drawbacks of the prior art.

SUMMARY OF THE INVENTION

Generally speaking, in accordance with the invention, inorganic membranes such as those including molecular sieve material can be produced in a useful convenient manner. These membranes can include zeo-type material. In accordance with the invention, arrays of defect free inorganic membranes such as those including zeo-type material with orientated configurations can be fabricated in the openings of screens which serve as a superstructure to give the membrane array (assembly) the desired physical properties. The individual membranes in the array can consist of a continuous thin film zeo-type membrane or a thin film membrane formed of interlocking zeo-type crystals. The membrane arrays can be used for the separation of gas and liquid mixtures as well as catalyzing changes in the chemical structures of the materials being separated.

In one embodiment, arrays of zeo-type membranes can be grown from various growth media in screens containing carefully fabricated symmetrical holes with smooth sides. The membranes grow in an oriented fashion from the edges of the holes into the center to form many small membranes of zeo-type material cojoined by a support mesh. Because of the manner of this growth the thickness of the zeo-type film across the hole is determined by the thickness of the screen. For example, ZSM-5 membranes can be formed across holes in the range of 200 microns in a single growth cycle which gives outstanding separation of gas molecules, as well as rugged handling characteristics.

In one embodiment, water soluble or water insoluble silicones can be treated to form acceptable inorganic membranes. The silicone can be exposed to basic conditions, with an appropriate structure directing template, suitable aluminum content and at a temperature that is appropriate for growing a desired inorganic crystal framework. The continuous thin film membranes or interlocking crystal membranes can be formed on the sides of a reaction vessel, on the surface of the reaction solution, on the surfaces of substrates introduced into the reaction solution or across the holes of a screen. For example, under ZSM-5 growth conditions, silicone polymers such as those prepared from dichlorosilanes or cyclic dialkyl/aryl siloxanes can be attacked by the hydroxyl group to displace the alkyl groups from the silicon atoms and to break the polymer chains and yield inorganic membranes.

Accordingly, it is an object of the invention to provide an improved method of forming inorganic membranes.

Another object of the invention is to provide zeo-type membranes with uniform pore size in the range of molecular sizes.

Another object of the invention is to provide a zeo-type membrane rugged enough to withstand the riggors of use in demanding applications.

A further object of the invention is to control the orientation of the pores in a zeo-type membrane.

Still other objects and advantages of the invention will in part be obvious and will in part be apparent from the specification and drawings.

The invention accordingly comprises the several steps and the relation of one or more of such steps with respect to each of the others, and the product possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Inorganic membranes in accordance with the invention can be formed from silicone polymers and other sources of silicon under basic conditions. The membranes can be true continuous thin films of crystalline material and can also be films of interlocking crystals. In a preferred embodiment of the invention, inorganic membranes are synthesized from polysiloxanes such as polydialkyl siloxanes or polydiarylsiloxanes. The material for the membranes formed can be placed in a suitable frame and can be used to effect separations, to catalyze reactions and to otherwise change the composition of gas or liquid fluid contacting the membrane. In one embodiment of the invention the membranes can be grown across the holes of a screen to yield an array of crystalline membranes on a screen support.

Inorganic membranes such as those including zeolitic material or other molecular sieve material in accordance with the invention can be stable over a broad temperature range, approaching and even exceeding 1000° C. and can be relatively inert to most materials. Inorganic membranes, such as zeolitic membranes formed in accordance with the invention can have channels and chambers having a pore size of from about 4 to 12 angstroms. The uniformity of pores in the zeo-type membranes can lead to valuable separation properties if they can be formed in thin enough films to achieve high enough fluxes for efficient processes. The crystal structure can include ionic centers such as when aluminum is incorporated in the crystal framework of a zeolite structure. These centers can interact with molecules having quadruple moments. This provides a second mechanism for separation and can also act as a catalytic center. Accordingly, membranes in accordance with the invention can act as membrane catalysts.

Acceptable inorganic membranes can be synthesized from silicone material, such as various substituted and unsubstituted polysiloxanes, especially polyalkyl siloxanes. Methods for performing this are discussed in copending application Ser. No. 07/864,814, filed Mar. 31, 1992, now U.S. Pat. No. 5,474,681, the contents of which are incorporated herein by reference. Silicone polymers include long alternating silicon-oxygen chains with organic groups on the open positions of the silicon atoms. Silicone polymers can be prepared from dichlorosilanes or cyclic dialkyl or diaryl siloxanes. When exposed to basic solutions and high temperatures, (such as under conventional ZSM-5 growth conditions) silicone material can be converted into inorganic membranes. The polymer is attacked by the hydroxyl group to displace the alkyl groups from the silicon atoms and to break the polymer chains. The type of group attached to the silicon atoms affects the rate of carbon-silicon bond breaking. Phenyl and other aromatic groups have relatively slow rates of displacement, while allyl groups and α- and β-chloro alkanes have fast rates.

Inorganic membranes in accordance with the invention can be synthesized by using silicones such as polydialkyl (aryl) siloxanes as the only source of silicon. Straight chain and cyclic silicones can be used. Zeolite precursors with four or more silicon atoms can be used. Silicones have different water solubilities and can be dissolved in a solution for growing zeolites. A layer of silicone can also be disposed on a substrate and immersed in the solution.

A solution for growing zeolitic material from silicone generally contains a base and can also contain a source of aluminum and a structure directing template for directing the growth of the desired framework. Acceptable bases include NaOH and $NaHCO_3$; the source of aluminum can be $Al_2O_3$ or $NaAlO_2$; and the template can be tetrapropylammonium bromide (TPA-Br) for the ZSM-5 framework or sodium ions for the zeolite-Y framework. The silicone and basic solution are heated at about 90° C. to 300° C., or higher, preferably at 100° to 200° C. for more than about four hours preferably more than 24 hours. An acceptable inorganic membrane can be synthesized from polysiloxane material and a solution of about 1 to 2% NaOH and any of about 1 to 15% TPA-Br and 0.1 to 0.3% $NaAlO_2$, heated at about 150° to 200° C.

The silicon source and base and optionally the aluminum source and template are heated at a temperature at which the desired zeolite framework is formed. The appropriate conditions for forming different types of zeolites from conventional starting materials such as $SiO_2$ are well known to those in the art. For example, to form a ZSM-5 framework, the solution or gel is heated at about 180° C. To form a zeolite-Y framework, the solution or gel is heated to about 100° C. Different zeolites are described in U.S. Pat. No. 5,019,263 at column 4, lines 8–24. Zeolite growth will generally take place during a period of from one to several days. If the conditions for forming a desired zeolite involve pressures above one atmosphere, the solution or gel can be heated in an autoclave.

The solution can be placed in a container with a Teflon surface. Inorganic membranes can form on the surface of the container. Stainless steel or an other relatively inert surface is also acceptable. Teflon surfaces have an advantage that it is easier to remove the membrane without breakage. However, it can be advantageous to grow a composite membrane on a porous surface and to leave the membrane in place so that the composite membrane will have greater strength. Growing the membrane across the holes of a screen are particularly useful. After the membrane is formed, it can be calcined at temperatures up to and exceeding 200° C. for about 1–50 hours.

If the silicone polymer is a solid and is insoluble in water, the silicone can be converted to a zeolite membrane directly. Otherwise, it can be solubilized. In that case, the solubilized silicone will tend to be converted to a membrane on the sides of the container or on the surface of the solution.

The type of product formed depends on the conditions of membrane growth. These conditions include the thickness of the polymer, the temperature and the reactants in the solution. Membranes can be grown to thicknesses of up to 500 and even 2,000 microns. Crystal sizes of zeolitic crystals, for example can be about 1–150 microns and frequently over 30 microns in size. Membrane growth will be observed both on the side of the vessel and on the surface of the solution. Generally, both types of growth will be observed. The silicone can also be enclosed in a sealed bag formed from extra coarse Teflon membrane for example. Dissolved material can easily migrate through such a bag. The solution will be seen to penetrate the bag, dissolve the silicone and form a zeolite membrane outside of the bag.

Inorganic membranes formed in accordance with the invention can be formed in a true three dimensional structure in which tetrahedra of primarily $SiO_4$ are bonded to common oxygen atoms. By varying the starting materials and synthesis conditions, the manner of this bonding can be selected. The tetrahedra can form basic units by forming 4, 5, 6, 8, 10 or 12 membered rings of interconnecting tetrahedra. Double rings can also be formed. The manner by which the rings can be interconnected determines the framework.

Cavities will be present in the framework and the entrance of the cavity forms a structure of 6, 8, 10, 12 or larger member rings. The cavities will therefore have uniform diameter and can act as a molecular sieve for molecules of different sizes.

The silicones used in the inorganic membrane formation process can be formed with different functional groups, as desired, to obtain polymers and inorganic membranes having different desirable properties. For example, the water solubility of the silicone can be increased by adding polar side groups, such as carboxylic acid, to the silicon atoms. Carboxylic acids are especially attractive because they will form salts in the basic solutions used to synthesize zeolite type membranes.

The rate of conversion of the organosilicones to inorganic membranes, such as zeolite membranes, can also be controlled by incorporating different organic groups within the silicone material. Although methyl groups work well, if higher rates of conversion are required, better leaving groups, such as chloromethyl or allyl groups can be used instead. Those of skill in the art will also note that different groups will be most appropriate for growing zeolite membranes at different temperatures.

By incorporating different elements in the silicone polymer, it is possible to incorporate those elements into the inorganic membrane framework. For example, it is known how to bond elements such as aluminum, boron and titanium to silicon through oxygen bridges. These elements will then be incorporated into the silicone polymer chains and would be available for incorporation into the membrane framework.

The term "molecular sieve" describes a wide variety of positive ion containing crystalline material. The material is generally characterized as an aluminosilicate although other crystalline material is included by the term "molecular sieve". Zeolites are a type of molecular sieve. Conventional molecular sieve membranes are discussed in U.S. Pat. No. 4,268,420. Membranes containing molecular sieve material having the following general formula can be synthesized in accordance with the invention.

$$X_2O_3: (n)YO_2$$

wherein X is a trivalent element such as Al, B, Fe, Ga and combinations thereof; Y is a tetravalent element such as Si, Ge, Ti and combinations thereof; and n is an integer having a value of at least 2 and typically from about 20 to about 10,000.

Inorganic membranes in accordance with the invention can be identical in composition and framework to known zeolites, such as ZSM-5 having the MFI structure. Zeolites have come to be designated by letters of other convenient terms, as set forth in U.S. Pat. No. 5,019,263, the contents of which are incorporated herein by reference. The ratio of silicon to aluminum can also be varied. In fact silicalite, a commercially available molecular sieve sold by Union Carbide contains no detectable aluminum, yet has the same pore size and framework as ZSM-5. Other commercially available zeolitic types are described in Chemical Engineering Progress, February 1988, which is incorporated herein by reference.

The zeo-type membranes in accordance with the invention that are formed from silicone polymers as the silica source typically have superior physical properties, compared to zeo-type membranes synthesized from gels. The membranes formed from silicone polymers will exhibit greater cross-linking among the interlocking crystals. This is due in part to sharing of polymer chains among crystals. Furthermore, zeolite membranes formed from silicone polymers can be in the form of true continuous zeolite thin films.

Zeolite membranes in accordance with the invention can be used as catalysts as well as for separating materials by contacting fluid against the membrane. Examples of mixtures that can be separated with zeolite membranes include oxygen/nitrogen, nitrogen/methane, carbon dioxide/methane, hydrogen/carbon monoxide, ethanol/water, branched hydrocarbons/straight hydrocarbons, specific types of xylene isomers/other xylene isomers, concentrated biomolecules/fermentation liquors and for the purification of natural gas or flu stack effluents.

Zeolitic membranes can also be useful in electrochemical systems, as described by Rolison, D. R. Chem. Rev., 90, 867 (1990), the contents of which are incorporated herein by reference. Composite membranes containing zeolites and pressed zeolite pellets have found application in both batteries and electrodes. However, a true continuous zeolite membrane thin film or a membrane of interlocking crystals would provide benefits and superior properties, compared to current zeolite membranes.

The zeolitic membranes formed in accordance with the invention could also be useful in catalytic systems. The aluminum centers in zeolites can serve as a catalytic site. The aluminum has a net negative charge and therefore must have an associated cation. If the cation is a hydrogen ion, then the zeolite is referred to as being in the acidic form. This acidic form has been found to be very valuable in catalytic cracking as well as other hydrocarbon conversions. These include dehydrogenation, the conversion of olefins and paraffins to aromatics, the conversion of alcohols and ethers to hydrocarbons, the alkylation of aromatics, the disproportionation of toluene and the isomerization of xylenes.

The cation can also be a metal ion, such as sodium. If the counter ion for the aluminum is a metal, the zeolite is generally referred to as being in the neutral state. However, neutral state zeolites can carry out base catalyzed reactions. For example, such zeolites can be used to catalyze dehydrohalogenation reactions at temperatures as low as 40° to 50° C.

Transition metal ions such as platinum can be incorporated into the zeolite in place of hydrogen or sodium, by carrying out an ion exchange reaction. The platinum ions can be reduced to the metal form and can provide platinum agglomerates in the pores and channels of the zeolite. These metal agglomerates can serve as catalytic centers for the oxidation or reduction of organic materials. In each of these applications, acid, base and noble metal catalysis, the zeolitic membranes in accordance with the invention present a promising alternative to current technologies that employ powdered zeolites in fluidized and fixed beds.

Zeolitic membranes are particularly well suited for conducting photochemical reactions. For example, when 7-dehydrocholesterol is photolyzed in zeolite-Y, a much higher percentage of pre-vitamin $D_3$ is obtained than when it is photolyzed in solution. Furthermore, high terminal selectivity can be obtained in the photochlorination of a long chain alkanes adsorbed on ZSM-5 zeolites. However, current technology using conventional fluidized beds provides inadequate photoefficiency. Even if fluidized bed efficiencies can be increased, it is still necessary to remove the product from the zeolite particles. However, by contacting a stream of reactant to a zeolite membrane illuminated with light of an appropriate wavelength impinging on the exterior surface of the membrane, the reaction will take place in the membrane and the product will exit the membrane without further processing. This will maximize the efficient use of light, control the exposure time per molecule and eliminate the need for extracting the product from the zeolite.

Zeolitic membranes in accordance with the invention could also be useful to separate the electrodes in a fuel cell. The membranes that are currently used are made of ionomers which are expensive and are limited to a maximum operating temperature of 80° C. A zeolite membrane plugged with carbon, such as by a cooking process would permit the migration of hydrogen ions, but prevent the passage of hydrogen and oxygen molecules. Such a membrane would have an operating temperature in the range of several hundred degrees. Zeolite membranes could also be valuable as components in the fuel cell electrodes.

An array of small inorganic membranes in accordance with the invention can be formed in the holes of screens, which acts as a superstructure to give the membrane assemblies desirable properties. The membranes can be interlocking crystals of zeo-type materials. These crystals can be oriented in various directions to give desirable orientations of the pores. These membranes can have different crystal frameworks including, but not limited to MFI, mordenite, faujasite and zeolite A. In addition, other zeo-type materials such as metallosilicates containing gallium, boron, zinc, iron or titanium, crystalline silicates, such as silicalite, and aluminophosphates, silicoaluminophosphates and metalloaluminophosphates can be used to form the membranes.

Inorganic membranes, such as those including zeo-type material in accordance with the invention, can be made stable over a broad temperature range, approaching and even exceeding 1000° C. and can be relatively inert to most reagents. Surprisingly, when the membranes are grown across the holes of a steel screen, the membranes will stay in place during large temperature changes, despite the large difference in thermal expansion coefficients. Zeo-type membranes can have channels and chambers having a pore size of from about 4 to 12 angstroms. This allows for the separation by size exclusion as well as by competitive absorption in the channels. The crystal centers can include ionic centers, such as when aluminum is incorporated into the crystal framework of a zeolite structure. These centers can interact with molecules having quadrapole moments. This provides another mechanism for separation. These ionic centers can also act as catalytic centers. Accordingly membranes in accordance with the invention can act as catalytic membranes.

To achieve the potential for zeo-type membranes it is necessary to have thin membranes which are strong enough to withstand the rigors of use. Large expanses of unsupported membranes are brittle and easily broken. By forming an array of small membranes supported by a meshwork screen of structural material a membrane assembly of much greater strength can be obtained. The thickness of the individual small membranes is established by the thickness of the screen that serves as the support. Screens that are 0.001 to 0.010 inches thick and have smooth, etched holes of a diameter about 0.001 to 0.015 inches in diameter will be suitable for many inportant applications.

It is not necessary to have a continuous layer of zeolite over the whole screen. When the surface of the screen is exposed to the growth solution this layer forms, but it can be easily removed without any effect on the separation properties of the membrane array within the holes.

The screen that acts as a support for the membrane array must have properties similar to those of the zeo-type membranes themselves to allow use in the desired applications. These include stability at high temperature and low reactivity.

The structure of the holes, which serve as the frames for the growth of the membrane windows, is an important aspect of the membrane growth. The holes should be uniform so that the window closes cleanly to give a flawless membrane. Various shaped holes, such as conical ones can be used, but cylindrical ones with parallel walls are preferred.

Although the actual crystal growth mechanism is not fully understood, it appears that the sides of the holes should be smooth so that the crystals will grow in an orientated fashion in one direction and meet in the middle of the hole. Oriented crystals have less blockages than powder crystals. For membranes, this means a larger throughput per unit area of membrane. In addition, by controlling the direction of the orientation of zeo-type material such as ZSM-5, mordenite and ALPO's the flow through the membrane can be directed through the most efficient direction. For example, in ZSM-5 Zeolites there are both straight and sinusoidal channels which are perpendicular to each other. Migration through the straight channels is mush faster than through the sinusoidal channels. By orienting the crystals in the direction so the straight channels are perpendicular to the surface of the membrane the molecules will enter the straight channels and proceed quickly through the membrane, maximizing throughput.

The support should have properties similar to the membrane, for example, high temperature stability and low reactivity. Materials that may be appropriate include metals such as stainless steel, ceramics, crystalline metal oxides such as sapphire or amorphous metal oxides such as glass.

Figure 1A:
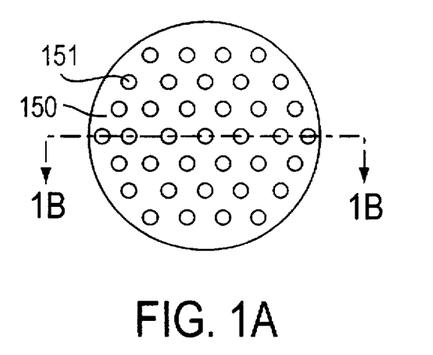
FIGS. 1A and 1B are top and plan schematic views of a screen having smooth sided walls.
Figure 1B:
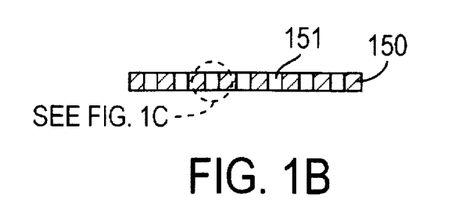
Figure 1C:
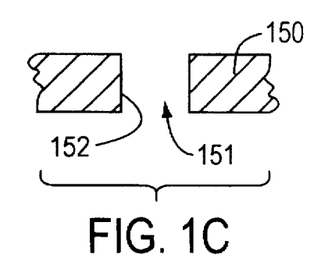
FIG. 1C is a schematic cross sectional view of an enlarged opening of one of the holes of the screen of FIGS. 1A and 1B.
Figure 2:
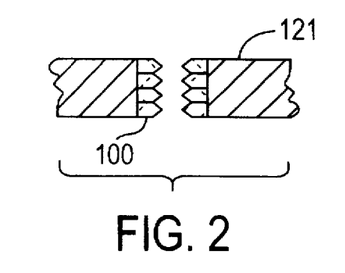
FIG. 2 is a schematic cross sectional view showing crystal growth across one hole of a screen with smooth parallel walls.
Figure 3:
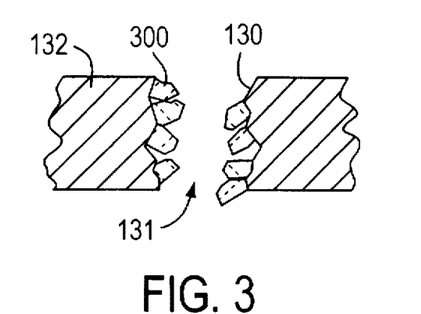
FIG. 3 is a schematic cross-sectional view of crystals growing on the walls of one hole of a screen, in which the walls are not smooth.

In the growth of an array of membranes on stainless steel screens it is important to maintain oriented growth as the crystals grow out from the edges of the holes into the center. To achieve this, it has been found that the holes should be very uniform and have smooth sides. A schematic top and cross sectional view of a screen 150 are shown in FIGS. 1A and 1B, respectively. An expanded view of a hole 151 defined by a smooth side (wall) 152 is shown in FIG. 1C. In FIG. 2, an array of crystals 100 are shown schematically growing out from a smooth parallel wall 110 defining a hole of a screen 121. As the crystals continue to grow they tend to maintain the same orientation. As shown in FIG. 3, if a wall 130 defining a hole 131 of a screen 132 is rough, an array of crystals 300 will grow in different directions giving a disoriented membrane with a much higher potential for flaws. Such flaws can permit fluids to pass through the membrane without encountering the pores, channels or chamber of the membrane.

The size of the holes in the screen also play a role in the properties of the resultant membrane array. The strength of the individual membranes in the array will depend inversely on the expanse of the surface area. Therefore the holes should be relatively small for increased strength. For thick membranes, holes up to 5000 µm in diameter should be adequate, but as for membranes less than 10 µm thick, the holes should be much smaller, in the range of 5 to 50 µm.

The membranes can be grown on supports using various formulations which include a source of silica, bases, and possibly organic templates and other metal ions. Methods of forming layers of crystalline zeo-type material are discussed in the following publications, which are all incorporated herein by reference: T. Sano, et al., Zeolites and Related Microporous Materials, Elsevier Science B. V., 84, 1175 (1994); T. Sano, F. Mizukami, H. Takaya, T. Mouri and M., Bull Chem. Soc. Jpn., 65, 146 (1992); E. R. Geus, et al., J. Chem. Soc. Faraday Trans., 88, 3101 (1992); E. R. Geus, et al., Microporous Materials, 1, 131 (1993); M. D. Jia, K. V. Peinemann and R. D. Behling, J. Memb. Sci., 82, 15 (1993); J. Dong, T. Dou, X. Zhao and L. Gao, J. Chem. Soc., Chem. Commun., 1056 (1992); G. J. Myatt, P. M. Budd, C. Price and S. W. Carr, J. Mater. Chem., 2, 1103 (1992); S. A. I. Barrl, J. G. Bratton and T. deV. Naylor, EP Application 0 481 660 A1 (1992); J. G. Bratton and T. deV. Naylor, EP Application 0 481 658 A1 (1992); S.A.I. Barrl, J. G. Bratton, T. deV. Naylor and J. D. Tomkinson, EP Application 0 481 659 A1 (1992); J. C. Jansen, W. Nugroho and H. van Bekkum, Proceedings of the 9th International Zeolite Conference, Montreal, 1992, R. von Ballmoos et al. eds., Butterworth-Heinmann 247 (1993).

Membranes can be grown from different feedstocks of silica. Gels can be prepared from finely divided silica or colloidal suspensions of these particles, for example Ludox® preparations from DuPont. In addition, these membranes can be prepared using silicones as a source of silica. It has been found that using the different feed stocks, it is possible to grow membranes with different orientations. By using different starting materials, it is possible to control the orientation of the pores in the membranes. Sol gels made from materials such as alkoxy silicon compounds can serve as another alternative source of silicon.

Silicones can be used to heal any flaws in the membrane surface. For example, a coating of silicone could be put on the grown membrane. This can then be treated with the growth solution to convert it to zeolite which would fill in any small flaws in the membrane.

Organic structure determining (directing) template material, although not always necessary, can be used to direct the zeolite growth to the desired framework. For example tetrapropyammonium (TPA) ions can be used for the MFI framework and tetraethylammonium (TEA) ions can be used for yielding mordenite.

Aluminum can be incorporated into the crystal framework by including aluminum ions in the growth mixtures. The incorporation of aluminum can affect the separation properties as well as serve as catalytic sites. This gives these membranes potential as catalytic membranes.

To have a functional membrane it is necessary to clear the zeolite pores of the organic templates needed to direct the formation of the desired framework. In a composite membrane, where there is a continuous layer of zeolite crystals on the surface of the substrate, there is a high probability of the formation of defects due to the different thermal coefficients of expansion of the two materials. In the array of small membranes, however, these stresses are much reduced, since the membrane is only attached to the substrate at the edges of the holes.

To have a functional array of membranes it will be necessary to have adhesion of the individual membranes to the surface of the support. The adhesion to the support should be greater than the bursting strength of the membrane to get maximum performance of the membrane. In many cases this adhesion is adequate with no pretreatment of the surface of the support. If improved adhesion is needed, various pretreatments can be used. Etching with acidic or basic solutions can form nanopits in the surface of the substrate which serve as physical anchors for the membrane. It can lead to activation of the surface to allow formation of chemical bonds between the substrate and membrane.

A preferred approach to achieving adhesion through chemical bonding between the membrane and substrate is to coat the substrate with a reactive coating process. For example, a layer of silicon can be deposited on a metal surface with the introduction of some oxygen during the coating process. The silicon side can bond to the metal surface, while the oxide side can bond to the crystal membrane material. Silicones with reactive side groups can be coated onto the substrates which can bond to the substrate. This surface can then be bonded to the membrane.

Membranes prepared in this manner can find application in many separation and production processes. They can be used in the separation of gasses, such as isolation of the components of air, purification of low quality natural gas, removal of pollutants from the air and treatment of stack gasses. They can also find application in liquid systems, such as the isolation of alcohols from water solutions and the concentration of dilute solutions of biologically important materials formed through fermentation. Because the zeotype material in the membranes can have catalytic centers in the pores associated with incorporation of aluminum or other metals in the crystal framework, they can also serve as catalytic surfaces that simultaneously separate the desired products from the reactants.

Membranes or membrane arrays in accordance with the invention can be used to separate chemical mixtures, whether in the gas or liquid phase, including pure air, contaminated air, methane containing mixtures, combustion exhaust gases, alcohol/water mixtures, mixtures of water and biologically important molecules, mixtures of organic compounds, mixtures containing xylene isomers and to catalyze changes in the chemical structure of the molecules being separated.

The films formed in accordance with the invention can be placed in an appropriate frame or support and can effect separations and can catalyze chemical reactions. The membranes can be configured as flat sheets, honeycombs or tubes. Honeycomb cross-flow membranes and tube membranes can provide very high filtration and are easy to clean. The membranes can also be formed on metal frits or porous ceramic surfaces.

Aspects and embodiments of the invention will be explained in greater detail with reference to the following examples. These examples are presented for purposes of illustration only and are not intended to be construed in a lumining sense.

EXAMPLE 1

An inorganic membrane was formed from silicone as a starting material. Silastic 590, a silicone product, is a poly- dimethysiloxane and contains vinyl groups and finely divided $SiO_2$ powder filler. Silastic 590 is a filled 2-part formulation available from Dow Corning Company. By mixing and thermosetting the mixture, it is possible to form a cross-linked silicone film with very desirable properties for the use in the synthesis of zeolite films. It is flexible, yet strong and stable at 180° C.

Silastic 590 from Dow Corning was hardened according to the directions. Equal parts of part A and part B were mixed and a thin layer of the mixture was coated on a glass plate. The plate was placed in an oven and heated at 180° C. until the polymer hardened. After the silicone polymer was permitted to cool, it was removed from the glass plate.

A less than 1 mm thick portion of the film (approximately 0.3 g) was placed in a Teflon lined vessel and covered with an aqueous solution (approximately 20 ml) containing an aluminum source (0.2% $NaAlO_2$), a base (1.4% NaOH) and a template (8.6% TPA-Br). All percentages recited in the Examples are on a weight basis. The film and solution were heated in an autoclave at 180° C. for three days. A thin film of inorganic material was formed. Portions of the thin film were washed with distilled water and examined under 500× magnification. Small balls having faceting at random angles were observed in the film. This evidences that the balls were interlocking crystals. The material was examined by X-ray diffraction and was found to include ZSM-5 zeolite and quartz which is assumed to have come from the filler.

The material was then tested to confirm the ZSM-5 structure. Hexane adsorption of the calcined zeolite gave 8% adsorption by weight. This was compared to Silicalite, which is a commercial high silicon material having substantially the same framework as ZSM-5. Silicalite exhibited 11% hexane adsorption. Accordingly, it was concluded that a ZSM-5 membrane had been formed from the Silastic 590.

EXAMPLE 2

Silastic 590 was cured according to directions and a 20×15×1 mm piece was sealed in a porous pouch formed of 5 micron Teflon membrane. The Teflon membrane was covered by the solution of Example 1 and heated at 180° in an autoclave for 4 days. On opening, the pouch was found to have a minor break that is assumed not to have affected the results. Some membrane growth had taken place on the Teflon side of the vessel holding the solution. However, most of the polymer in the bag had been converted to zeolite film in place.

EXAMPLE 3

(for comparison)

Finely divided $SiO_2$ powder available from the Aesar company, 30 Bond St. Ward Hill Mass. 01835 (approximately 15 g) was sealed in the Teflon bag of Example 2. The bag was covered with the solution from Example 2 and heated in an autoclave under the same conditions. The bag was found to be intact and full of solution. There was no film formed on the sides of the container and the solid inside the bag appeared identical to the starting Aesar $SiO_2$ when examined under a microscope. Accordingly, it was concluded that zeolite membranes cannot be formed under the conditions of Examples 1–3, using $SiO_2$ as the silicon source. However, zeolite membranes will form when silicone polymer is used as the source.

EXAMPLE 4

In order to include template material in the polymer material, Silastic 590 was cured at 75° C. with 8% tripropylamine. A portion similar in size to that of Example 2 of the cured Silastic 590 was covered with a solution containing 0.2% NaAlO$_2$ and 1.4 NaOH, but no TBA-Br. The silicone and solution were heated in a vessel for two days at 180° C. The solution was found to have an oily surface and a film was found at the bottom of the vessel as was some powder. Microscopic examination of the film showed that it was very similar in structure to the film formed in Example 1. Accordingly, it was concluded that the template can be incorporated into the cured polymer and need not be added in the solution.

EXAMPLE 5

Both parts of Silastic 590 are not needed to form the inorganic membranes. Part B only of Silastic 590, a viscus liquid, was coated onto a Teflon plate. The plate was approximately circular in shape and 15–20 mm in diameter. The coating was about 1 mm thick. The coated plate was covered with a solution containing 1.4% NaOH and 8.6% TBA-Br in a Teflon lined vessel. The container was heated at 180° C. for two days. Some material was formed on the bottom of the vessel. There was also a film of material formed on the Teflon plate. Microscopic examination of that material showed that it was a film having integrated highly faceted crystals and was concluded to be silicalite. Accordingly, part B of uncured Silastic 590 can be converted to an inorganic membrane.

EXAMPLE 6

Inorganic membranes can also be formed from unfilled silicone polymer. Sylgard 184 was prepared and cured at 75° C. Sylgard 184 is an unfilled silicone polymer available from the Dow Corning Company. A 0.6745 gram piece of the cured polymer was placed in a Teflon lined vessel containing about 20 ml of an aqueous solution including 1.4% NaOH and 8.6% TBA-Br. The vessel was heated at 180° C. for six days. A silicalite film had formed over the bottom and sides of the container and had formed a dome over the top of the solution. The side of the membrane towards the container was a poorly defined bumpy surface. The side of the membrane towards the solution showed a well defined grid of interlocking crystals having a ZSM-5 type framework.

EXAMPLE 7

Uncured Sylgard 184 was coated on a Teflon plate and covered with solution as in Example 6. The polymer and solution were heated for six days at 180° C. and a thin zeolite membrane was found to have formed on the Teflon plate. The film showed a well defined network of crystals on both sides. The side closest to the Teflon exhibited much smaller crystals than did the side facing the solution.

EXAMPLE 8

A 0.6 gram sample of Sylgard 184 was treated as in Example 6 and was heated for five days at 180° C. A film having well defined interlocking crystals was formed. The film was ground and examined by X-ray diffraction. The results showed that the sample was approximately 100% silicalite. The ground-up membrane adsorbed 11% hexane by weight, the same amount adsorbed by commercial silicalite. The membrane was examined by atomic absorption analysis which showed that the amount of aluminum present was below the detection limits of the instrument, less than 1 mg of Al to 233 mg of silicon.

EXAMPLE 9

A zeolite membrane was prepared as in Example 8, except that 0.2% NaAlO$_2$ as an aluminum source was added to the solution. The ground membrane had an X-ray diffraction pattern essentially identical to that obtained from Example 8. Atomic absorption analysis showed 1.39 mg of aluminum per 386 mg of silicon. Accordingly, it was possible to incorporate aluminum from solution into the crystal network and form a zeolite membrane.

EXAMPLE 10

The procedures of Example 10 were substantially the same as those of Example 8. However, a transparent film was formed that did not show any observable crystalline structure. The membrane was ground and shown to contain silicalite together with amorphous silica. Accordingly, it was concluded that a true continuous zeolite membrane thin film had been formed.

EXAMPLE 11

To solubilize cross-linked silicone polymer, 0.62 grams of Sylgard 184 was dissolved in 19.66 grams of D$_2$O containing 0.90 grams of 40% NaOD in D$_2$O. The solution was heated at 180° C. for five days and then filtered. A $^1$H NMR of the filtrate was taken and the presence of Si-CH$_3$ from the silicone polymer was observed. Accordingly, it was concluded that the cross-linked silicone polymer was solubilized in the basic solution.

EXAMPLE 12

Sylgard 184 was treated with NaOD/TPA-Br/D$_2$O solution heated to 180° C. for 1½ days. The reaction product was filtered and $^1$H NMR show the presence of silicone polymer metals. Accordingly, the presence of TPA-Br in solution does not prevent solubilization of the silicone polymer.

EXAMPLE 13

An inorganic membrane was formed from pure polydimethyl siloxane. Polydimethyl siloxane was prepared by adding dimethyldichlorosilane to a sodium hydroxide solution and stirring the solution until silicone polymer material collected as a viscous oily material at the top of the solution. The oily silicone polymer material was separated from the remaining viscous solution.

0.61 grams of collected silicone material was added to a NaOH/TPA-Br solution having approximately the same composition as in Example 6. The polymer and solution were heated in an autoclave at 180° C. for 7 days. On opening the autoclave, a very high quality zeolite thin film membrane was found at the bottom of the container. Membrane films were also formed on the sides of the container and over the top of the solution. The membrane film was semitransparent and was formed of interlocking crystals having a diameter of approximately 10 to 40 microns. The mass of the films collected was 0.20 grams. No individual crystals or crystal agglomerates were found in the autoclave. Accordingly, it was concluded that high quality inorganic membranes could be formed from pure polydimethylsiloxane.

EXAMPLE 14

An inorganic membrane film was formed from a cyclic silicone. 0.66 grams of decamethylcyclopentasiloxane was reacted with an NaOH/TPA-Br solution as in Example 13. 0.03 grams of zeolite film was collected. The film was thinner than in Example 13 and was formed from larger interlocking crystals, having a diameter of approximately 30 to 100 microns. It was concluded that cyclic siloxanes are converted to zeolites more slowly than are linear siloxanes. It was also concluded that the structure of the silicone material has an affect on the structure of the membrane.

EXAMPLE 15

0.65 grams of decamethyltetrasiloxane was reacted with NaOH/TPA-Br solution, as in Example 14. A small amount of zeolite film was recovered, together with agglomerates of zeolite crystals having a diameter of about 150 microns. The total mass of zeolite material collected was 0.11 grams.

EXAMPLE 16

A chlorination reaction was carried out by combining a hydrocarbon and chlorine gas in a membrane formed in accordance with the invention, in the presence of light. An inorganic membrane was prepared as set forth in Example 13. 0.88 g of polydimethylsiloxane was converted to an inorganic membrane and the membrane was calcined at 650° C. for 90 minutes. The membrane weighed 54.1 mg and three ml of dichloromethane solution containing 3.3 mg of n-dodecane was poured over the membrane. The solvent was removed under a stream of nitrogen and the membrane was allowed to sit until it reached a constant weight of 57.9 mg. The loaded membrane was then placed into a beaker which was purged with nitrogen. The beaker was covered and 2.6 ml of chlorine gas was added. The beaker was then irradiated for 20 minutes with a Black-Ray model B-100A lamp which has a maximum at 365 nm. The membrane was extracted with dichloromethane for thirty minutes. The dichloromethane was then removed under a stream of nitrogen and hexane was added.

It was determined by a gas chromatographic analysis that 28% of the dodecane had been converted to chlorinated hydrocarbon. The selectivity data obtained agreed with values reported for silicalite in U.S. Pat. No. 4,971,664, Examples 104 and 110. The terminal selectivity ($S_0$) was 1.2 (36% of the monochlorinated product was 1-chlorodecane (ST)) versus 0.3 to 0.4 which is common for solution photochemistry ($S_T$=10–12%). The percentage of monochlorinated product in the product mixture ($S_MO$) was 84%.

Accordingly, it was demonstrated that membranes in accordance with the invention are useful for carrying out regiocontrolled reactions. Chlorine can be mixed with hydrocarbon and the mixture can be passed through an illuminated membrane. This will lead to better control of stoichiometric ratios of reagents compared with many conventional fluidized bed systems.

EXAMPLES 17, 18, 19 AND 20

To grow zeo-type membranes on metal screens from gel formulations, tetrapropylammonium bromide (TPABr) and NaOH were dissolved in distilled water. Ludox AS-40 (silicon source) was then added dropwise. The resulting solution was stirred for 30 minutes. Then it was poured into a Teflon lined autoclave. The molar composition was:

100 $SiO_2$:4.5 NaOH:5.22 TPABr:2832 $H_2O$

A stainless steel Micro-Etch Perforated Metal screen from Buckbee-Mears (identified below in Table 1) was suspended in the solution in the autoclave. The autoclave was heated in oven at 180° C. for 7–14 days. A zeolite membrane was formed over the entire surface of the screen. Examination under a microscope showed that the holes of the screen were completely filled.

The zeolite phases of all membranes were found to be ZSM-5 type by X-ray diffraction.

TABLE 1

| Ex. No. | Screen No. | Screen Data |
|---|---|---|
| 17 | #50-1-0 | 0.005" thick |
|  |  | 0.011" hole, evenly etched |
| 18 | #6-4-4 | 0.006" thick |
|  |  | 0.007" hole, evenly etched |
| 19 | #5-1-4 | 0.005" thick |
|  |  | 0.006" hole, conical shape |
| 20 | #8-3-0 | 0.008" thick |
|  |  | 0.010" hole, conical shape |

EXAMPLES 21, 22, 23 AND 24

To grow zeo-type membranes on screens using different formations, shown in Table 2, tetrapropylammonium bromide (TPABr) and NaOH were dissolved in distilled water. Ludox AS-40 was then added dropwise. The resulting solution was stirred for 30 minutes, then poured into a Teflon lined autoclave.

The zeolite phases of all membranes were found to be ZSM-5 type by X-ray diffraction.

| Ex. No. | Screen No. | Formulation |
|---|---|---|
| 21 | #50-1-0 | 100 $SiO_2$:4.5 NaOH:5.22 TPABr:2804 $H_2O$ |
| 22 | #2-2-8 | $SiO_2$:0.1 NaOH:0.1 TPABr:80 $H_2O$ |
|  |  | 0.002" thick |
|  |  | 0.003" hole |
|  |  | conical shape |
| 23 | #2-1-8 | $SiO_2$:0.1 NaOH:0.1 TPABr:80 $H_2O$ |
|  |  | 0.002" thick |
|  |  | 0.003" hole |
|  |  | Evenly etched |
| 24 | #5-1-4 | $SiO_2$:0.1 NaOH:0.1 TPABr:80 $H_2O$ |

EXAMPLE 25

The screen # 2-2-8 was etched in 2.4N HCL solution for 1 hour prior to use. The formulation used was same as in Example 22. A zeo-type membrane covered the whole surface of the screen and filled the holes.

EXAMPLES 26, 27, 28 AND 29

The membrane a r rays used in the permeability and separation studies herein were calcined to remove the TPA ions in the channel structure. The calcination procedure was to heat in air at 500° C. for 8 hours. The temperatures were ramped up and down at 1° C. per minute. Following calcination, there appeared to be no evidence of damage to the membrane arrays. Adhesion to the stainless steel substrates was still strong.

Figure 4:
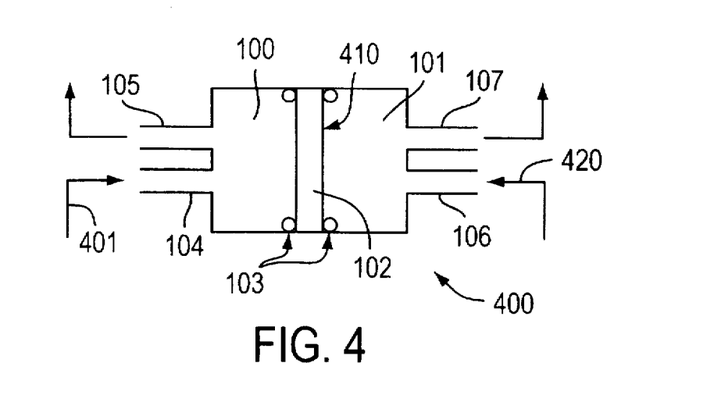
FIG. 4 is a schematic view of a separation device including a membrane constructed in accordance with the invention.

Permeability and separation properties of the zeo-type membranes in Examples 7–25 were determined in a test cell 400 shown schematically in FIG. 4. Cell 400 is formed with a two-piece cylindrical module 100 and 101 which can be screwed together to hold a membrane 410 mounted on a holder 102 between a pair of washers 103 to prevent leakage. Module 100 includes an inlet port 104 and an outlet port 105. Likewise, module 101 includes an inlet port 106 and an outlet port 107. On one side of cell 400, the feed stream containing a gas stream 401 of known composition enters through inlet port 104. After passing over membrane 410 this stream exits through port 105 and is referred to as the retentate. On the other side of cell 400 an inert carrier gas 420 enters through port 106, picks up the molecules that permeate through membrane 410 and carry them out through port 107. This gas stream is referred to as the permeate. Sampling of the feed, retentate and permeate can be carried out on-line.

Figure 5A:
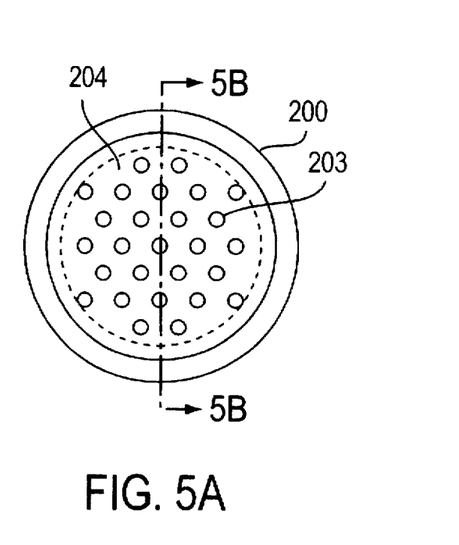
FIG. 5A is a schematic front view of a device holding a membrane constructed in accordance with the invention.
Figure 5B:
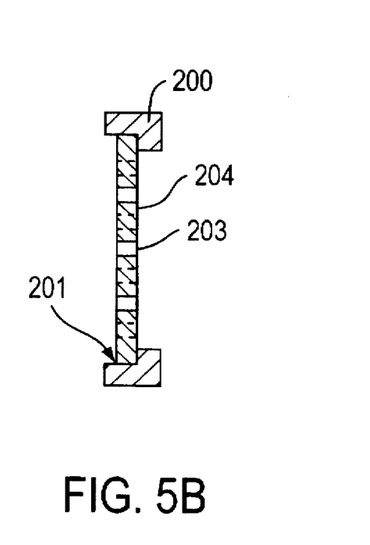
FIG. 5B is a side view of the membrane and holder of FIG. 5A.

The cell used for these examples was made of stainless steel. Referring to FIGS. 5A and 5B, a zeotype membrane array 203 on a screen 204 was glued to a stainless steel ring 200 having a groove 201 around the inside of ring 200, with screen 204 glued in groove 201. This eliminates the need to put pressure on the membrane itself.

The feed stream was introduced into the separation cell through reservoirs containing n-hexane and 2,2-dimethylbutane, respectively. Both reservoirs were kept in water bath at 23° C. for consistent rates of evaporation. The flow rate of the feed side was 60 ml/min and that of the permeate side was 15 ml/min. Nitrogen was used as carrier gas.

The composition and selectivity of feed and permeate mined and summarized below in Table 3.

TABLE 3

| Ex No. | Membrane | Feed hex/2,2-DMB | Permeate hex/2,2-DMB |
| --- | --- | --- | --- |
| 26 | Ex. 17 | 46/54 | 90/10 |
| 27 | Ex. 19 | 65/35 | 100/0 |
| 28 | Ex. 20 | 55/45 | 70/30 |
| 29 | Ex. 22 | 51/49 | 89/11 |

As shown above in Table 3, the ratio of hexane passing through the membrane was much greater than the feedstock showing that defect free membrane arrays and high conversions can be achieved using this approach.

EXAMPLE 30

This example describes a general technique for growing arrays of zeotype membranes on screens using silicones as the silicon source. Sylgard® 184, Part B (Dow-corning) (0.8334 g) was put in the bottom of a 23 mL Teflon cup (Parr). A stainless steel screen (Buckbee-Mears 6-4-4, 0.006 in thick with 0.007 in holes) was suspended in the cup. To this was added 13.0 mL of a solution containing 0.2889 g NaOH (Aldrich) and 1.9856 g of TPA-Br (Aldrich, Lot 07409 EX) in 20 mL of water was poured into the cup without disturbing the silicone on the bottom. The screen was totally immersed in the solution. The $Si:Na_2O:TPA:H_2O$ ratio for the mixture was 2.4:1.0:1.0:155. The covered cup was placed in a housing and placed in a 180° C. convection oven for 7 days. A zeolite film was formed over the whole surface. Microscopic examination showed that all of the holes in the screen were completely filled. In some cases a second treatment was required to complete formation of the membrane.

EXAMPLE 31

The permeability and selectivity measurement of the zeotype membrane from Example 30 was calcined and tested as above and the results are summarized in Table 4.

TABLE 4

| Ex. No. | Membrane | Feed hex/2,2-DMB | Permeate hex/2,2-DMB |
| --- | --- | --- | --- |
| 31 | Ex. 30 | 52/48 | 90/10 |

As shown above in Table 4, the ratio of hexane passing through the membrane was much greater than in the feedstock, showing that defect free zeotype membrane arrays capable of changing the composition of fluid contacting the membranes can be fabricated on a support from silicones as a silica source.

EXAMPLE 32

The surface membrane from Example 30 was broken up and removed from the surface. Microscopic examination showed that the holes of the screens were still completely filled with the zeotype membrane. Permeability and separation measurement shown below in Table 5 still shows significant separation of n-hexane from 2,2-dimethylbutane.

TABLE 5

| Ex. No. | Membrane | Feed hex/2,2-DMB | Permeate hex/2,2-DMB |
| --- | --- | --- | --- |
| 32 | broken up Ex. 30 surface | 50/50 | 79/21 |

EXAMPLE 33

This Example presents an x-ray study of a membrane array on a screen, in which the membrane was grown from silicones.

Figure 6:
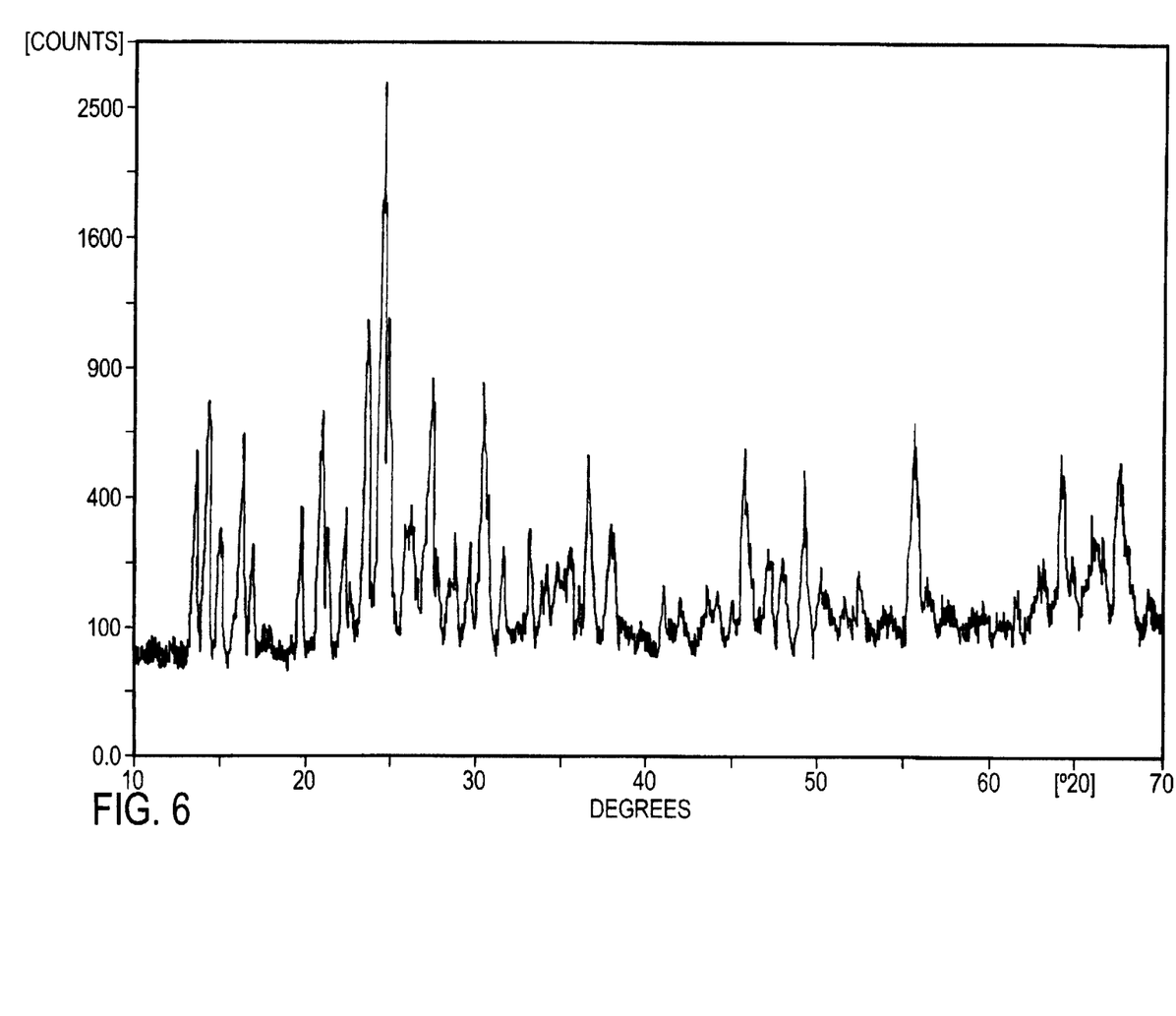
FIGS. 6 and 7 are x-ray diffraction patterns in the 25° range of the zeotype material from the surface and holes, respectively of a membrane array formed on a screen support from silicone material in accordance with the invention.
Figure 7:
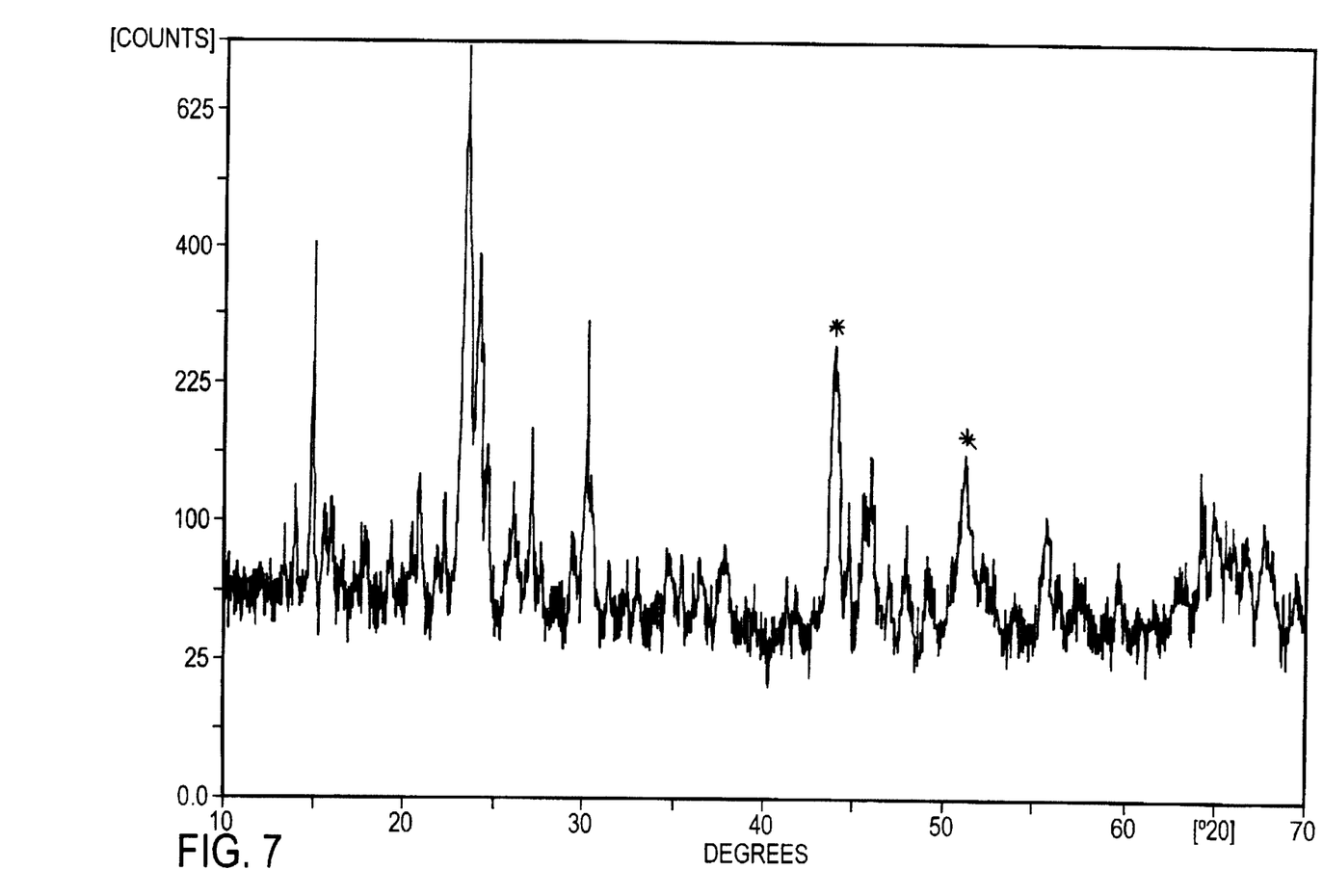
Figure 8:
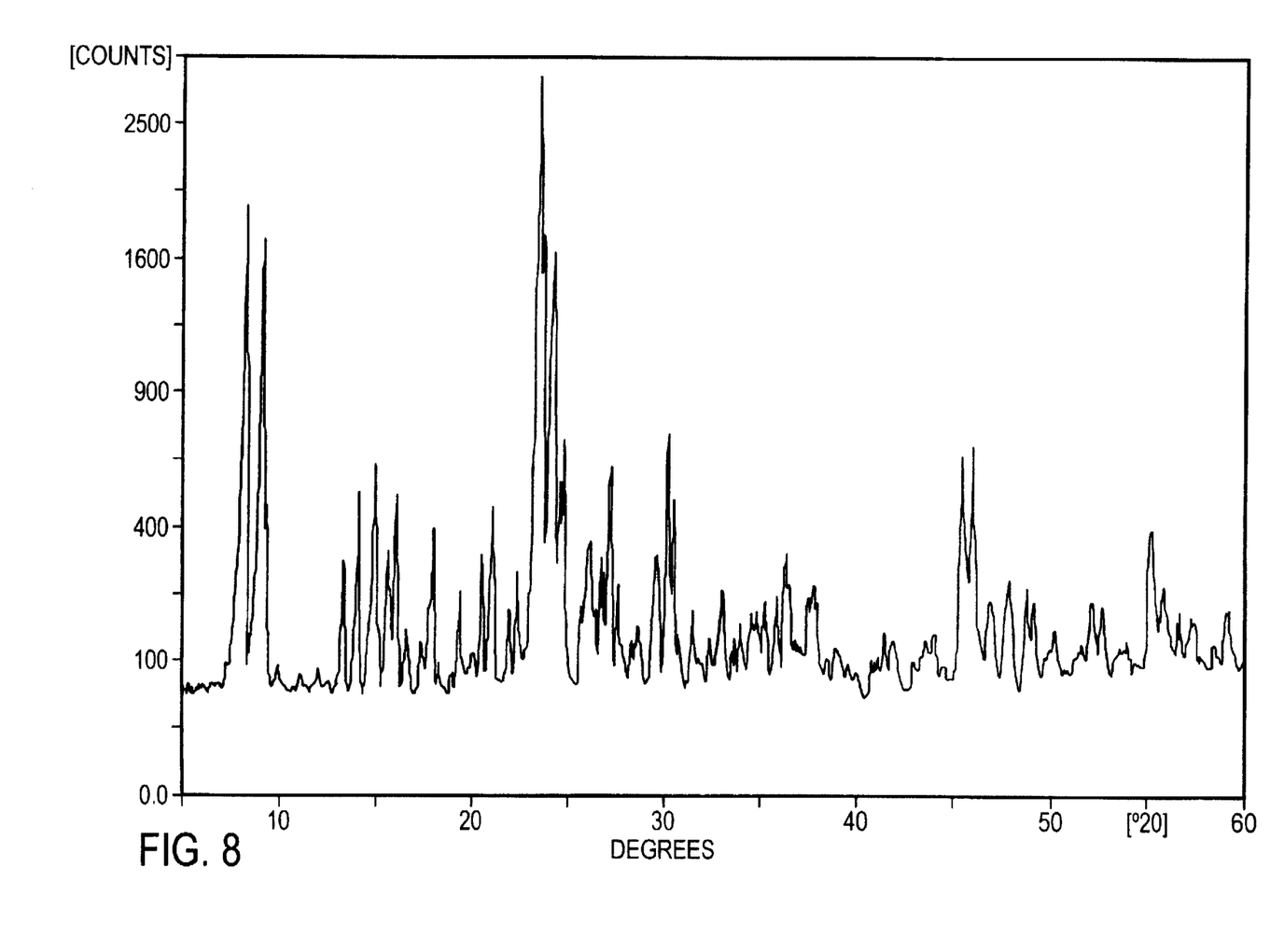
FIG. 8 is an x-ray diffraction pattern for the powdered form of the material of the membrane array of FIGS. 6 and 7.

Both surfaces of a zeolite membrane array prepared as in Example 30 were studied with x-ray diffraction. The two sides were essentially identical with orientation of the crystals. The x-ray diffraction pattern of the membrane surface is shown in FIG. 6. The zeolite layer on the surface of the screen was removed by bending the screen until it broke loose. It adhered strongly to the metal. Microscopic examination of the surface showed that the membrane array in the holes was still intact. The diffraction pattern for the membrane array in the holes of the screen is shown in FIG. 7. A comparison of FIG. 6 and FIG. 7 shows that both the membrane on the surface and the membranes in the holes differ from ZSM-5 powder (FIG. 8) in the intensities of some important peaks and suggest more orientation than the powder.

EXAMPLE 34

This example presents an x-ray study of a membrane array in which the membranes were grown from gel formulations.

Figure 9:
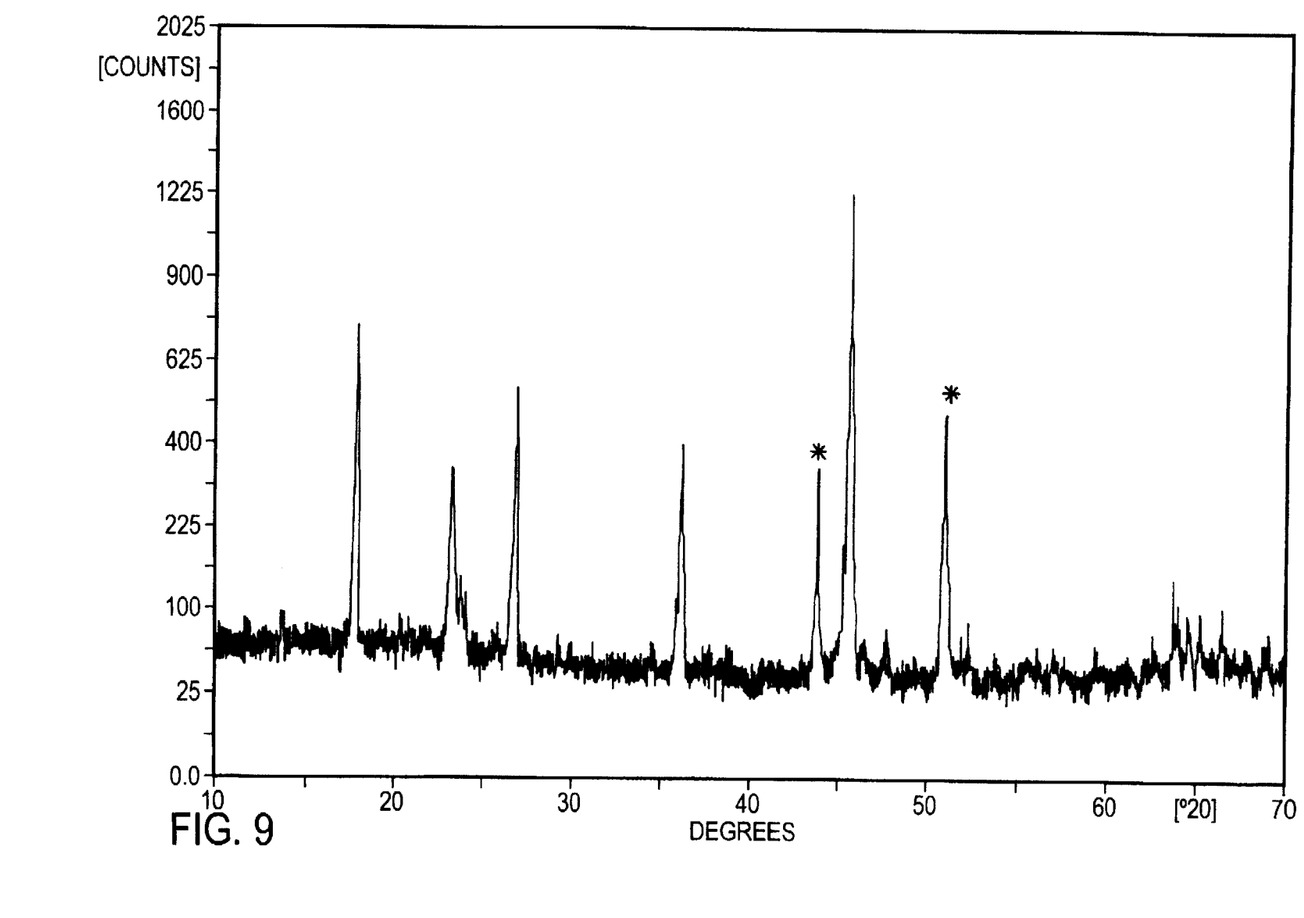
FIGS. 9 and 10 are x-ray diffraction patterns of the holes and surface, respectively of a membrane array formed on a screen support by the gel method in accordance with the invention.
Figure 10:
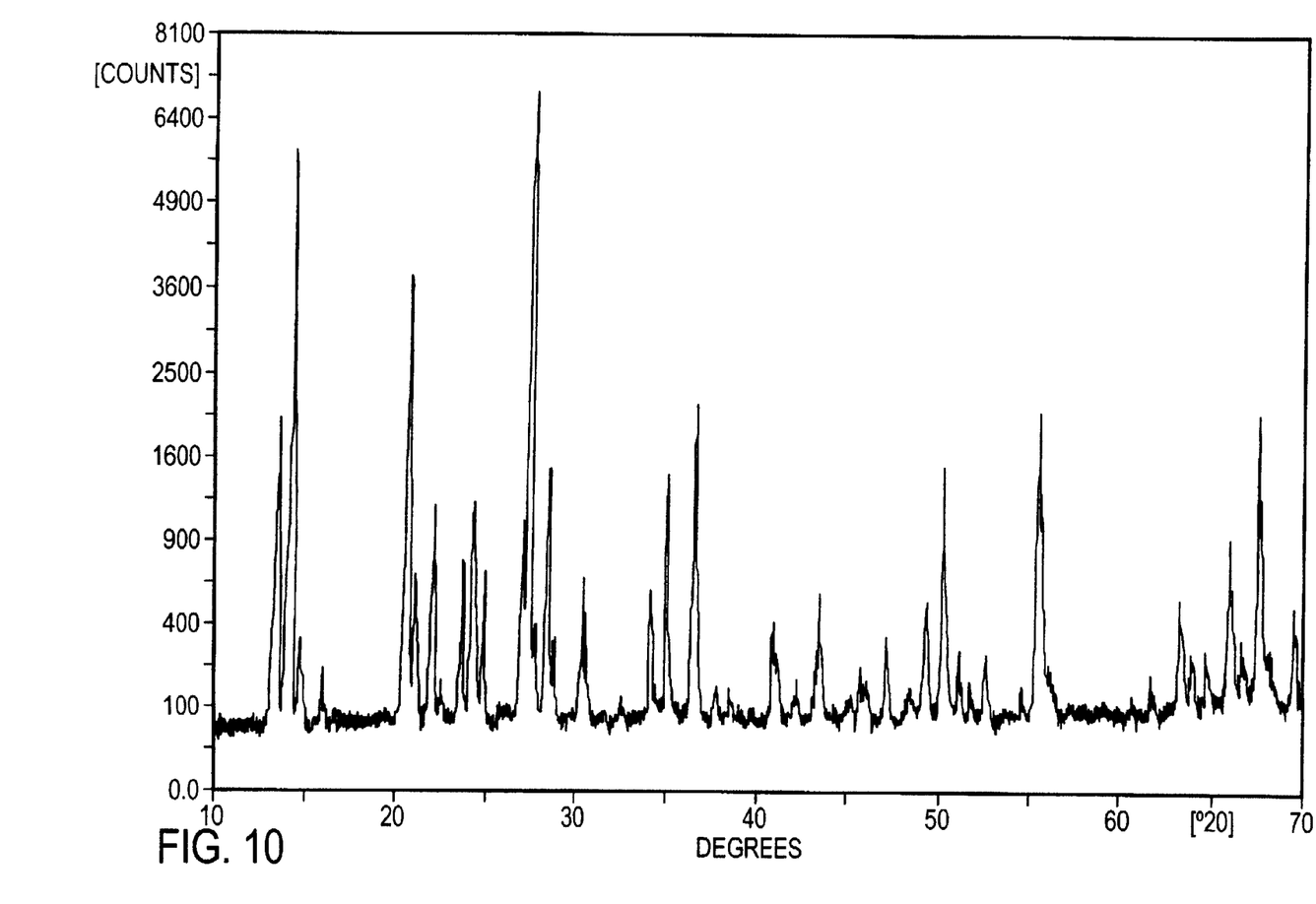

Both surfaces of a zeolite membrane prepared as in Example 33 were studied with x-ray diffraction. The zeolite layer on the surface of the screen was removed by bending the screen. Microscopic examination of the screen surface showed that the membrane array was still intact. The diffraction patterns of the membranes in the holes (FIG. 9) were dramatically different from the patterns for the surface membrane (FIG. 10). The reduced number of peaks showed that the membrane array in the holes had a significantly higher degree of orientation.

EXAMPLE 35

This example and Example 36 demonstrate the incorporation of aluminum into the zeolite framework. The procedure in Example 30 was followed, except that sodium aluminate was added to give a Si:Al ratio of 89:1 for the reaction mixture. This procedure was repeated three times to give a defect free membrane. Some of the membrane was removed from the screen and analyzed. The Si:Al ratio of the membrane was 107:1, similar to the reaction mixture.

EXAMPLE 36

The same procedure was followed as in Example 35 was followed, but the Si:Al ratio was 27:1. The ratio in the membrane was found to be 12:1. To show that the ratio was not significantly affected by nonframework aluminum, the membrane was ground up and sonicated in distilled water three times. The ratio only increased to 13, showing that aluminum was actually in the crystal framework.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A membrane array, comprising:
a support defining a plurality of holes defined by interior walls that are substantially symmetrical about the central axis of the holes and crystalline zeo-type material grown completely across the holes and bonded to the walls defining the holes.

2. The membrane array of claim 1, wherein support is made of metal.

3. The membrane array of claim 2, wherein the metal is a stainless steel screen.

4. The membrane array in claim 1, wherein the support is formed of ceramic material.

5. The membrane array of claim 4, wherein the ceramic is made of aluminum oxide.

6. The membrane array of claim 1, wherein the support is formed of crystalline metal oxides.

7. The membrane array of claim 6, wherein the crystalline metal oxide is sapphire.

8. The membrane array of claim 1, wherein the support is formed of amorphous metal oxides.

9. The membrane array in claim 8, wherein the amorphous metal oxide is glass.

10. The membrane array of claim 1, including an inlet and an outlet mounted on the support with the support between the inlet and the outlet.

11. The membrane array of claim 1, wherein the walls defining the holes are parallel and are cylindrical in structure.

12. The membrane array of claim 1, wherein the walls defining the holes are conical in structure.

13. The membrane array of claim 1, wherein the walls defining the holes have smooth sides and a flat surface.

14. The membrane array of claim 1, wherein the support has a thickness of from 1 to 1000μ.

15. The membrane array of claim 1, wherein the thickness of the support is substantially equal to the thickness of the membrane.

16. The membrane array of claim 1, wherein the diameter of the inorganic membranes across the holes is from 5 to 5000 microns.

17. The membrane array of claim 1, wherein the interior walls of the support are pretreated to increase the adhesion of the inorganic membranes to the interior walls.

18. The membrane array of claim 17, wherein the pretreatment is acid or base etching.

19. The membrane array of claim 17, wherein the pretreatment is a coating of the superstructure with metals or metalloids with or without the presence of oxygen.

20. The membrane array in claim 17, wherein the pretreatment is a coating with silicone.

21. The membrane array of claim 1, wherein the pores in the zeo-type membrane are oriented in a selected direction.

22. The membrane array of claim 1, wherein the zeo-type material is silicalite.

23. The membrane array of claim 1, wherein the zeo-type material is an aluminosilicate.

24. The membrane array of claim 1, wherein the zeo-type material is an aluminophosphate.

25. The membrane array of claim 1, wherein the zeo-type is an aluminosilicophosphate.

26. The membrane array of claim 1, wherein the zeo-type material is a metaloaluminophsophate.

27. A method of forming an inorganic membrane that can change the composition of fluid contacting the membrane, comprising the steps of combining silicone material in a basic solution with structure determining template material; immersing a support defining a plurality of holes therethrough in the solution, the holes defined by walls that are substantially symmetrical about the central axis of the holes; heating the solution and support at a temperature of about 90° C. to 300° C. for more than 4 hours; and growing a layer of inorganic material completely across the holes of the support.

28. The method of claim 27, wherein the silicone material includes polyalkylsiloxane material.

29. The method of claim 27, wherein the starting materials and conditions are selected so that at least a portion of the layers of inorganic material formed have a zeo-type structure and framework.

30. The method of claim 27, wherein the starting materials and conditions are selected so that at least a portion of the layers of inorganic material formed consist of interlocking porous crystals.

31. The method of claim 27, wherein the silicone, base template and support are heated to a temperature of from 100° to 200° C. for more than 24 hours.

32. The method of claim 27, wherein the support is a stainless steel screen having smooth walls defining the holes.

33. The method of claim 27, wherein the inorganic material has the general formula:

$$X_2O_3 \cdot (n)YO_2$$

wherein X is a trivalent element selected from the group consisting of aluminum, boron, iron and gallium and combinations thereof; Y is a tetravalent element selected from the group consisting of silicon, germanium, titanium, and combinations thereof; and n is at least 2.

34. A method of forming a membrane array, comprising the steps of: forming a zeo-type forming gel; introducing a perforated support into the gel, the support defining a plurality of holes that are substantially symmetrical about the central axis thereof; heating the gel under conditions to convert the gel into zeo-type material and growing the crystalline zeo-type material across the holes.

35. The method of claim 34, wherein the gel is a gel for forming zeolites and contains a source of silicon, a source of aluminum and a base.

36. The method of claim 35, wherein the gel is heated to between 90° and 300° C.

37. The method of claim 34, wherein the perforations are defined by smooth walls.

* * * * *